(12) United States Patent
Bylander et al.

(10) Patent No.: US 9,207,413 B2
(45) Date of Patent: Dec. 8, 2015

(54) OPTICAL SUBSTRATE HAVING A PLURALITY OF STAGGERED LIGHT REDIRECTING FEATURES ON A MAJOR SURFACE THEREOF

(75) Inventors: James R. Bylander, Austin, TX (US); Ding Wang, Austin, TX (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/236,341

(22) PCT Filed: Sep. 13, 2012

(86) PCT No.: PCT/US2012/054994
§ 371 (c)(1),
(2), (4) Date: Jan. 31, 2014

(87) PCT Pub. No.: WO2013/048743
PCT Pub. Date: Apr. 4, 2013

(65) Prior Publication Data
US 2014/0193116 A1    Jul. 10, 2014

Related U.S. Application Data

(60) Provisional application No. 61/539,070, filed on Sep. 26, 2011.

(51) Int. Cl.
*G02B 6/42* (2006.01)
*G02B 6/32* (2006.01)
*G02B 6/36* (2006.01)
*G02B 6/38* (2006.01)
*G02B 6/26* (2006.01)

(52) U.S. Cl.
CPC ............ *G02B 6/4206* (2013.01); *G02B 6/4249* (2013.01); *G02B 6/26* (2013.01); *G02B 6/322* (2013.01); *G02B 6/3652* (2013.01); *G02B 6/3672* (2013.01); *G02B 6/3853* (2013.01); *G02B 6/3885* (2013.01); *G02B 6/4214* (2013.01)

(58) Field of Classification Search
None
See application file for complete search history.

(56) References Cited

U.S. PATENT DOCUMENTS

| | | | |
|---|---|---|---|
| 1,620,774 A | 3/1927 | Maurer |
| 4,078,852 A | 3/1978 | Lebduska |
| 4,421,383 A | 12/1983 | Carlsen |
| 4,666,238 A | 5/1987 | Borsuk et al. |
| 4,701,011 A | 10/1987 | Emkey et al. |
| 5,163,113 A | 11/1992 | Melman |

(Continued)

FOREIGN PATENT DOCUMENTS

| | | |
|---|---|---|
| DE | 29811449 | 1/2003 |
| EP | 2 031 427 | 3/2009 |

OTHER PUBLICATIONS

PCT International Search Report for PCT/US2012/054994 mailed on Dec. 7, 2012, 5 pages.

*Primary Examiner* — Jerry Rahll
(74) *Attorney, Agent, or Firm* — Clifton F. Richardson

(57) ABSTRACT

The disclosure generally relates to sets of optical waveguides such as optical fiber ribbons, and fiber optic connectors useful for connecting multiple optical fibers. In particular, the disclosure provides an efficient, compact, and reliable optical fiber connector that incorporates a unitary substrate comprising a plurality of staggered light redirecting features on an input surface thereof directing incoming light from optical fibers through the substrate towards optical elements to be coupled with.

29 Claims, 7 Drawing Sheets

(56) References Cited

U.S. PATENT DOCUMENTS

| | | |
|---|---|---|
| 5,390,271 A | 2/1995 | Priest |
| 5,682,449 A | 10/1997 | Taira-Griffin |
| 6,422,761 B1 | 7/2002 | Naghski et al. |
| 6,904,197 B2 | 6/2005 | Bhagavatula et al. |
| 7,033,084 B2 | 4/2006 | Lappohn |
| 7,189,007 B2 | 3/2007 | Imanbayev et al. |
| 7,197,224 B2 | 3/2007 | Rolston et al. |
| 7,315,669 B2 | 1/2008 | Ohtorii |
| 7,399,125 B1 | 7/2008 | Whaley et al. |
| 7,522,807 B2 | 4/2009 | Rolston et al. |
| 7,648,287 B2 | 1/2010 | Epitaux et al. |
| 2003/0138223 A1 | 7/2003 | Sasaki et al. |
| 2006/0210222 A1 | 9/2006 | Watte et al. |
| 2007/0183707 A1 | 8/2007 | Umezawa |
| 2007/0183709 A1* | 8/2007 | Furuno et al. .................. 385/14 |
| 2009/0107613 A1 | 4/2009 | Cosentino |
| 2009/0290836 A1 | 11/2009 | Lee et al. |
| 2010/0215313 A1 | 8/2010 | Matsuoka et al. |
| 2011/0064358 A1 | 3/2011 | Nishimura |
| 2012/0099820 A1 | 4/2012 | Rolston et al. |

* cited by examiner

OPTICAL SUBSTRATE HAVING A PLURALITY OF STAGGERED LIGHT REDIRECTING FEATURES ON A MAJOR SURFACE THEREOF

RELATED APPLICATIONS

This application is related to the following U.S. patent application, which is incorporated by reference: TRANSCEIVER INTERFACE HAVING STAGGERED CLEAVE POSITIONS (application Ser. No. 61/539,080), filed on an even date herewith.

TECHNICAL FIELD

The present invention relates to an optical connector for connecting sets of optical waveguides such as optical fiber ribbons.

BACKGROUND

Optical fiber connectors are used to connect optical fibers in a variety of applications including: the telecommunications network, local area networks, data center links, and for internal links in high performance computers. These connectors can be grouped into single fiber and multiple fiber designs and also grouped by the type of contact. Common contact methods include: physical contact wherein the mating fiber tips are polished to a smooth finish and pressed together; index matched, wherein a compliant material with an index of refraction that is matched to the core of the fiber fills a small gap between the mated fibers' tips; and air gap connectors, wherein the light passes through a small air gap between the two fiber tips. With each of these contact methods a small bit of dust on the tips of the mated fibers can greatly increase the light loss.

Another type of optical connector is referred to as an expanded beam connector. This type of connector allows the light beam in the source connector to exit the fiber core and diverge within the connector for a short distance before the light is collimated to form a beam with a diameter substantially greater than the core. In the receiving connector the beam is then focused back to its original diameter on the tip of the receiving fiber. This type of connector is less sensitive to dust and other forms of contamination.

The optical cables used in many applications make use of fiber ribbons. These ribbons are comprised of a set of coated fibers joined together in a line (typically 4, 8 or 12 fibers in a line). The individual glass fibers with their protective coatings are typically 250 μm in diameter and the ribbons typically have a fiber to fiber pitch of 250 μm.

Currently available expanded beam multiple fiber connectors typically limit the beam diameter to 250 μm to match the ribbon pitch. In order to achieve a beam diameter greater than the fiber pitch, current connectors require the fiber ribbon to be manually split into single fibers before mounting the fibers on the connector.

In general, single fiber optical connectors include a precision cylindrical ferrule for aligning and contacting optical fiber end faces with each other. The optical fiber is secured in the central bore of the ferrule so that the fiber's optical core is centered on the ferrule axis. The fiber tip is then polished to allow physical contact of the fiber core. Two such ferrules can then be aligned with each other using an alignment sleeve with the polished fiber tips pressed against each other to achieve a physical contact optical connection from one fiber to another. Physical contact optical connectors are widely used.

Multiple fiber connectors often use a multiple fiber ferrule such as the MT ferrule to provide optical coupling from the source fibers to the receive fibers. The MT ferrule guides the fibers in an array of molded bores to which the fibers are typically bonded. Each ferrule has two additional bores in which guide pins are located to align the ferrules to each other and thus align the mated fibers.

A variety of other methods have also been used to make fiber to fiber connections. Included are V-groove alignment systems such as found in Volition™ optical fiber cable connectors, and bare fiber alignment in an array of precise bores. Some connecting concepts such as described in, for example, U.S. Pat. Nos. 4,078,852; 4,421,383; and 7,033,084 make use of lenses and or reflecting surfaces in optical fiber connections. Each of these connecting concepts describes single purpose connection systems, such as an in line connector or a right angle connector.

It would be advantageous to provide an expanded beam connector that can terminate fiber ribbons without separating the fibers and also provide a beam with a diameter greater than the fiber-to-fiber pitch.

SUMMARY

The disclosure generally relates to sets of optical waveguides such as optical fiber ribbons, and fiber optic connectors useful for connecting multiple optical fibers such as in optical fiber ribbon cables. In particular, the disclosure provides an efficient, compact, and reliable optical fiber connector that incorporates a unitary substrate combining the features of optical fiber alignment, along with redirecting and shaping of the optical beam. In one aspect, the present disclosure provides a unitary substrate that includes a first major surface having a plurality of staggered light redirecting features, and an opposing second major surface having a plurality of staggered microlenses, each light redirecting feature corresponding to a different microlens. Each light redirecting feature includes an input surface for receiving light from an optical waveguide, and a light redirecting surface for redirecting the received light to the corresponding microlens through the substrate, the light redirecting surface making an oblique angle with the input surface, wherein the substrate and the pluralities of the microlenses and the light redirecting features form a unitary construction. In another aspect, the present disclosure provides an optical connector that includes an optical fiber ribbon cable and the unitary substrate.

In another aspect, the present disclosure provides a unitary substrate that includes a first major surface having a plurality of spaced apart discrete light redirecting features disposed along a first row and adapted to redirect light exiting a first plurality of optical fibers and a continuous light redirecting feature spaced apart from the first row adapted to redirect light exiting a second plurality of optical fibers, each space between the plurality of discrete spaced apart light redirecting features in the first row being adapted to receive a corresponding different optical fiber from the second plurality of optical fibers. The unitary substrate further includes a second major surface opposite the first major surface and having a plurality of staggered microlenses forming first and second rows of microlenses, each microlens in the first row being adapted to receive light that is redirected by a corresponding different discrete light redirecting feature in the first row of spaced apart discrete light redirecting features, and each microlens in the second row being adapted to receive light that is redirected from the continuous light redirecting feature, wherein the substrate, the plurality of spaced apart discrete light redirecting features, the continuous light redirecting feature, and the pluralities of staggered microlenses form a unitary construction. In another aspect, the present disclosure provides an optical connector that includes an optical fiber ribbon cable and the unitary substrate.

In yet another aspect, the present disclosure provides an optical construction that includes a unitary substrate; a first plurality of optical fibers, each fiber having an end face that faces an input face of a different discrete light redirecting feature in the plurality of spaced apart discrete light redirecting features; and a different second plurality of optical fibers, each fiber being disposed in a corresponding different space between the plurality of spaced apart discrete light redirecting features, each fiber having an end face that faces an input face of the continuous light redirecting feature. The unitary substrate includes a first major surface having a plurality of spaced apart discrete light redirecting features disposed along a first row and adapted to redirect light exiting a first plurality of optical fibers and a continuous light redirecting feature spaced apart from the first row adapted to redirect light exiting a different second plurality of optical fibers, each space between the plurality of discrete spaced apart light redirecting features in the first row being adapted to receive a corresponding different optical fiber from the second plurality of optical fibers. The unitary substrate further includes a second major surface opposite the first major surface and having a plurality of staggered microlenses forming first and second rows of microlenses, each microlens in the first row being adapted to receive light that is redirected by a corresponding different discrete light redirecting feature in the first row of spaced apart discrete light redirecting features, and each microlens in the second row being adapted to receive light that is redirected from the continuous light redirecting feature, wherein the substrate, the plurality of spaced apart discrete light redirecting features, the continuous light redirecting feature, and the pluralities of staggered microlenses form a unitary construction. In another aspect, the present disclosure provides an optical connector that includes an optical fiber ribbon cable and the unitary substrate.

In yet another aspect, the present disclosure provides a unitary substrate that includes a first major side having a first floor surface; a first staircase formed on the first floor surface and having at least a first step having a first tread; and a first plurality of staggered light redirecting features disposed on the first floor surface and forming rows of light redirecting features. The unitary substrate further includes a second plurality of staggered light redirecting features disposed on the first tread of the first staircase and forming rows of light redirecting features; a second major side opposite the first major side and having a second floor surface; and a second staircase formed on the second floor surface and having at least a first step having a first tread. The unitary substrate still further includes a first plurality of staggered microlenses disposed on the second floor surface and forming rows of microlenses, each microlens corresponding to a different light redirecting feature on the first floor; and a second plurality of staggered microlenses disposed on the first tread of the second staircase and forming rows of microlenses, each microlens corresponding to a different light redirecting feature on the first tread of the first staircase. The substrate, the first and second staircases, the light redirecting features, and the microlenses form a unitary construction. In another aspect, the present disclosure provides an optical connector that includes an optical fiber ribbon cable and the unitary substrate.

In yet another aspect, the present disclosure provides a unitary substrate that includes a first major surface having a plurality of staggered light redirecting features, each light redirecting feature including: an input surface for receiving light from an optical waveguide; a light redirecting surface for redirecting the received light as a collimated light or a focused light through the substrate, the light redirecting surface including a shaped reflector; and an opposing second major surface, wherein the substrate and the pluralities of the light redirecting features form a unitary construction. In another aspect, the present disclosure provides an optical connector that includes an optical fiber ribbon cable and the unitary substrate.

In yet another aspect, the present disclosure provides a unitary substrate that includes a first major side having a first floor surface; a first staircase formed on the first floor surface and comprising at least a first step comprising a first tread; and a first plurality of light redirecting features and a first waveguide alignment feature disposed on the first floor surface, the first waveguide alignment feature capable of positioning a first plurality of optical waveguides to inject light into the first plurality of light redirecting features. The unitary substrate further includes a second plurality of light redirecting features and a second waveguide alignment feature disposed on the first tread of the first staircase, the second waveguide alignment feature capable of positioning a second plurality of optical waveguides to inject light into the second plurality of light redirecting features. The unitary substrate still further includes a second major side opposite the first major side and having a second floor surface; a second staircase formed on the second floor surface and having at least a first step comprising a first tread; and a first plurality of microlenses disposed on the second floor surface, each microlens corresponding to a different light redirecting feature on the first floor. The unitary substrate still further includes a second plurality of microlenses disposed on the first tread of the second staircase, each microlens corresponding to a different light redirecting feature on the first tread of the first staircase; wherein the substrate, the first and second staircases, the light redirecting features, and the microlenses form a unitary construction. In another aspect, the present disclosure provides an optical connector that includes an optical fiber ribbon cable and the unitary substrate.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
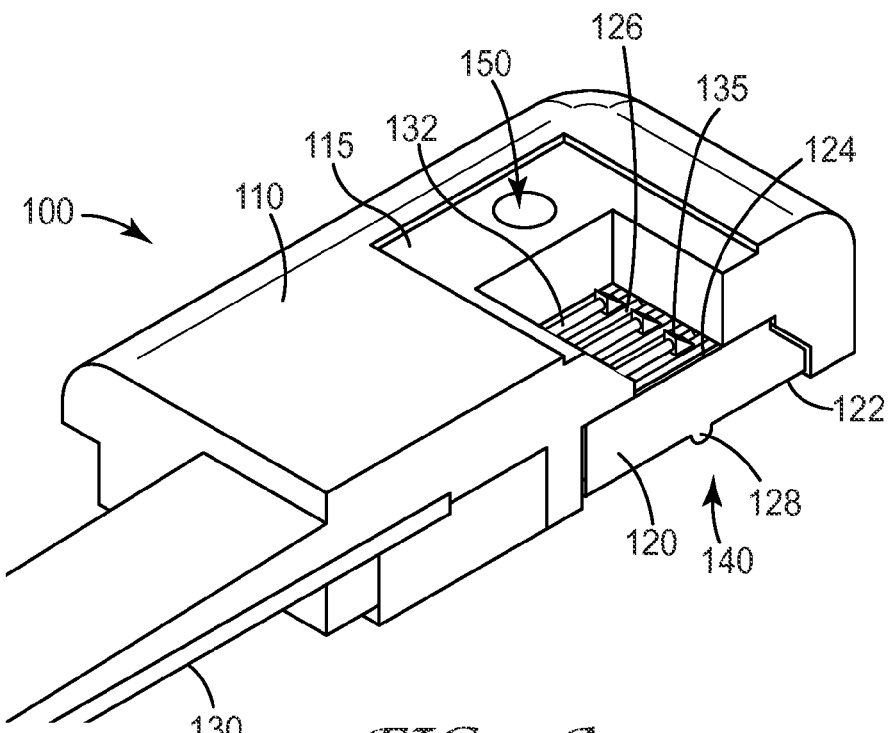
FIG. 1A shows a cut-away perspective view of a fiber optic connector.

The present disclosure relates sets of optical waveguides such as optical fiber ribbons, and fiber optic connectors useful for connecting multiple optical fibers such as in optical fiber ribbon cables. The description that follows is directed toward connections of optical fibers and optical fiber ribbon cables; however, it is to be understood that the present disclosure is similarly directed to connections of optical waveguides including, for example, planar optical waveguides that can be fabricated from polymeric materials or glasses.

There are a number of optical fiber connector features that users of optical fibers desire, which are not found in currently available products. These features include low cost, robust performance against contamination, easy cleaning, compact designs, and the ability to rapidly and repeatedly connect multiple optical fibers with a single connector. A rapidly growing application for high capacity interconnections is between equipment racks in data centers where data rates of 10 Gb/s are common, and link lengths are relatively short (typically a few to 100 meters). In such applications, multiple single fiber connectors are often ganged together. Accordingly, described herein is a multiple fiber connecting technique and article which can significantly reduce the cost of multi-fiber connecting.

In one particular embodiment, a general purpose connecting element for multi-fiber optical connectors includes a unitary substrate that makes use of angled reflecting surfaces and a microlens array to redirect and focus or collimate the optical beams. The redirected beams emerge from the element perpendicular to a planar mating surface. The microlens elements can be located in a pocket and can be slightly recessed from the mating surface. The connecting elements also include mechanical features to facilitate alignment of the microlens arrays of the two mated parts. In one particular embodiment, the reflecting surfaces may be fabricated as a portion of the unitary substrate, and may have surfaces that can be aligned at an angle to the optical axis of the fiber optic. In some cases, the reflective surface may be coated with a reflecting material such as a metal or metal alloy to redirect the light. In some cases, the reflective surface may instead enable Total Internal Reflection (TIR) to facilitate redirecting the light.

The unitary substrate can be encased in a connector housing that can provide support for the optical cable, ensure alignment of interlocking components of the connector element, and provide protection from the environment. Such connector housings are well known in the art, and can include, for example, alignment holes, matching alignment pins, and the like. The same connecting element can be used in a variety of connecting configurations. It can also be used to interface optical fibers to optical devices such as VCSELs and photodetectors using a board mounted alignment ring. It is to be understood that although the disclosure provided herein describes light travelling in one direction through the fiber and the connector, one of skill in the art should realize that light could also travel in the opposite direction through the connector, or could be bi-directional.

The relatively simple design used for both the unitary substrate and the connector housing, eliminates the use of fine core pins such as in an MT ferrule molding, and as a result, the cost and complexity of the molded, cast, or machined part is reduced. Furthermore, a general purpose connecting element described herein can be used in a variety of applications, thereby allowing both development costs and manufacturing costs to be spread across higher volume, decreasing the cost per part. Still further, the use of an expanded optical beam from focusing or collimating microlenses can also provide for improved resistance to transmission losses due to dirt or other impurities.

In one particular embodiment, the unique interface defined herein can be used for making internal links within high performance computers, servers, or routers. Additional applications in mating to optical back planes can also be envisioned. Some of the prominent features of the connecting elements can include: a molded (or cast, or machined) component having a generally planar mating surface, and a recessed area (pocket) within the mating surface; convex microlens features located on the floor of the pocket with the apex of these microlens features being within the pocket volume so that when two elements are mated with their mating surfaces in contact, a small gap exists between the microlens features; optical fiber alignment features useful to align the optical fibers axes generally within about 15 degrees of parallel to the mating surface; and reflecting surfaces to redirect the optical beam from each fiber so that they are perpendicular to the mating surface. Each optical beam is centered over one of the microlens features; and mechanical alignment features facilitate the alignment of two connecting elements so that their mating surfaces are in contact and their microlenses are aligned.

In one particular embodiment, the microlens features may collimate the light beam from the fiber. Generally, collimated light can be useful for making fiber-to-fiber connections, since the light beam is generally expanded upon collimation, which makes the connection less susceptible to contamination by foreign material such as dust. In one particular embodiment, the microlens features may instead focus the beam so as to create a beam "waist" in the plane of the mating surface. Generally, focused beams can be useful for making fiber-to-circuit connections such as to a sensor or other active device disposed on a circuit board, since the light beam can be concentrated to a smaller region for greater sensitivity. In some cases, particularly for optical fiber-to-fiber connections, collimation of the light beam may be preferred, since the collimated light beams are more robust against dirt and other contamination, and also provide for greater alignment tolerances.

In one particular embodiment, the reflecting surface can be a molded or cast feature in the unitary substrate of the connecting element. In some cases, the reflective surface can be a planar surface oriented at an angle to the light beam. In some cases, the reflective surface can instead be a curved reflecting element such as a parabolic mirror, a spherical mirror, an elliptical mirror, and the like, such that additional focusing optics may not be necessary. In some cases, planar reflective surfaces may be preferred.

In one particular embodiment, the optical fibers can be aligned using waveguide alignment features, such as within molded vee-groove features in the unitary substrate, with the vee-grooves being parallel to the mating surface; however, vee-grooves are not required for alignment in all cases. As described herein, optional parallel vee-grooves are included, but it is to be understood that other techniques for alignment and securing of the optical fibers would also be acceptable. Furthermore, vee-grooved alignment may not be suitable in some cases and other techniques may be preferred, for example, when the optical waveguide is a planar optical waveguide. In some cases, the alignment of the optical waveguides and/or optical fibers can instead be accomplished by any of the techniques known to one of skill in the art of optical fiber alignment using any suitable waveguide alignment feature.

A variety of mechanical feature sets may be used to align a pair of connecting elements. One feature set includes a pair of precisely positioned holes into which alignment pins are placed, similar to the alignment technique used for MT ferrules. In one particular embodiment, if the holes diameters and locations are similar to that of the MT connector, then one of the connecting elements described herein could (with an appropriate set of microlenses) intermate with an MT ferrule.

FIG. 1A shows a cut-away perspective view of a fiber optic connector 100 according to one aspect of the disclosure. Fiber optic connector 100 includes a connector housing 110 having an optional cover support 115, an optional cover (not shown) that fits within the optional cover support 115 to protect the optical components of the fiber optic connector 100 from the environment, and an alignment feature 150. A unitary substrate 120 having a plurality of optional parallel vee-grooves 126 for accepting individual optical fibers 132 from an optical ribbon cable 130 is secured within connector housing 110. A light re-directing surface 135 is associated with each of the individual optical fibers 132, such that in operation, light from each individual optical fiber 132 is re-directed through unitary substrate 120 and out through a corresponding microlens 128 disposed on lower surface 122. The microlenses 128 can be disposed in a cavity 140 such that the lens surface is indented from the bottom of the connector housing 110. The light re-directing surface 135 can be directly molded into the unitary substrate 120, and forms an oblique angle with the axis of the fiber, as described elsewhere.

Unitary substrate 120 can be fabricated from any suitably transparent and dimensionally stable material including, for example, polymers such as a polyimide. In one particular embodiment, unitary substrate 120 can be fabricated from a dimensionally stable transparent polyimide material such as, for example, Ultem 1010 Polyetherimide, available from SABIC Innovative Plastics, Pittsfield Mass. In some cases, the individual optical fibers 132 can be adhesively secured in the optional parallel vee-grooves 126. In one particular embodiment, an index matching gel or adhesive may be inserted between the unitary substrate 120 and the individual optical fibers 132. By eliminating any air gap in this area, Fresnel losses may be greatly reduced.

Figure 1B:
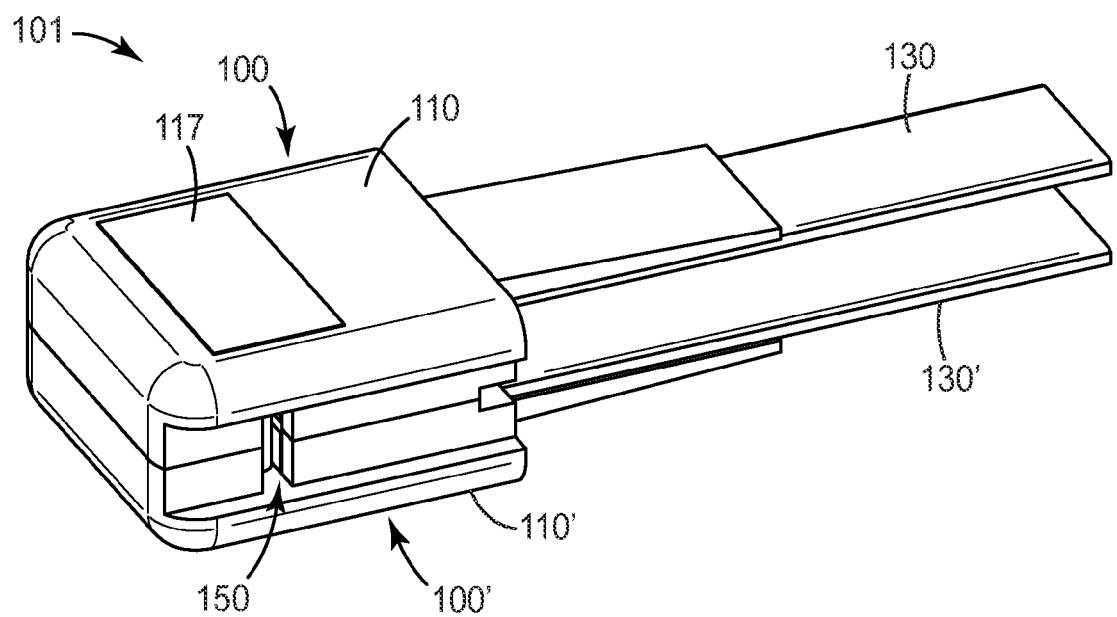
FIG. 1B shows a perspective view of a fiber optic connector.

FIG. 1B shows a perspective view of the fiber optic connector 100 of FIG. 1A connected to a second fiber optic connector 100'. Second fiber optic connector 100' can be identical to the fiber optic connector 100, and forms an optical connection 101, as described elsewhere. Optional cover 117 is disposed on optional cover support 115 (shown in FIG. 1A) to protect the optical components of the fiber optic connector 100 from the environment. Alignment features 150 serve to ensure that light from optical ribbon cable 130 and second optical ribbon cable 130' are coupled efficiently, with a minimum of losses.

Figure 2A:
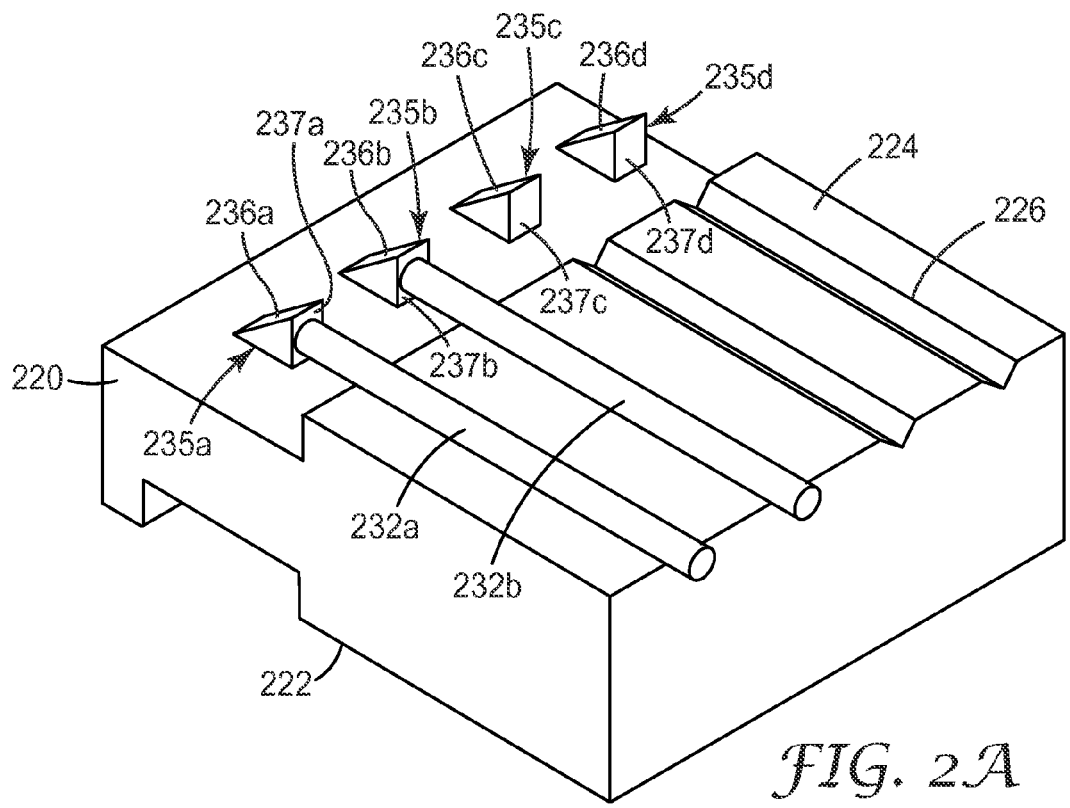
FIG. 2A shows a top perspective schematic view of a unitary substrate.

FIG. 2A shows a top perspective schematic view of a unitary substrate 220, according to one aspect of the disclosure. Unitary substrate 220 includes a first surface 224 having a plurality of optional parallel vee-grooves 226 that are aligned with a plurality of light re-directing features 235a, 235b, 235c, 235d, and an opposing second surface 222. A plurality of input optical fibers (two are shown as first input optical fiber 232a and a second input optical fiber 232b) are positioned along optional parallel vee-grooves 226, and may be adhered to the optional parallel vee-groove 226, as described elsewhere. Each of the light re-directing features 235a-235d include a light redirecting surface 236a, 236b, 236c, 236d, and a light input surface 237a, 237b, 237c, 237d, respectively, that can be directly molded into unitary substrate 220. Each of the input optical fibers 232a, 232b, are positioned such that the end of each of the input optical fibers 232a, 232b are configured to inject light into the respective light input surface 237a, 237b, 237c, 237d. Each of the light redirecting surfaces 236a-236d serve to re-direct light into the unitary substrate 220 at an angle perpendicular to the axis of the input optical fibers 232a, 232b.

Figure 2B:
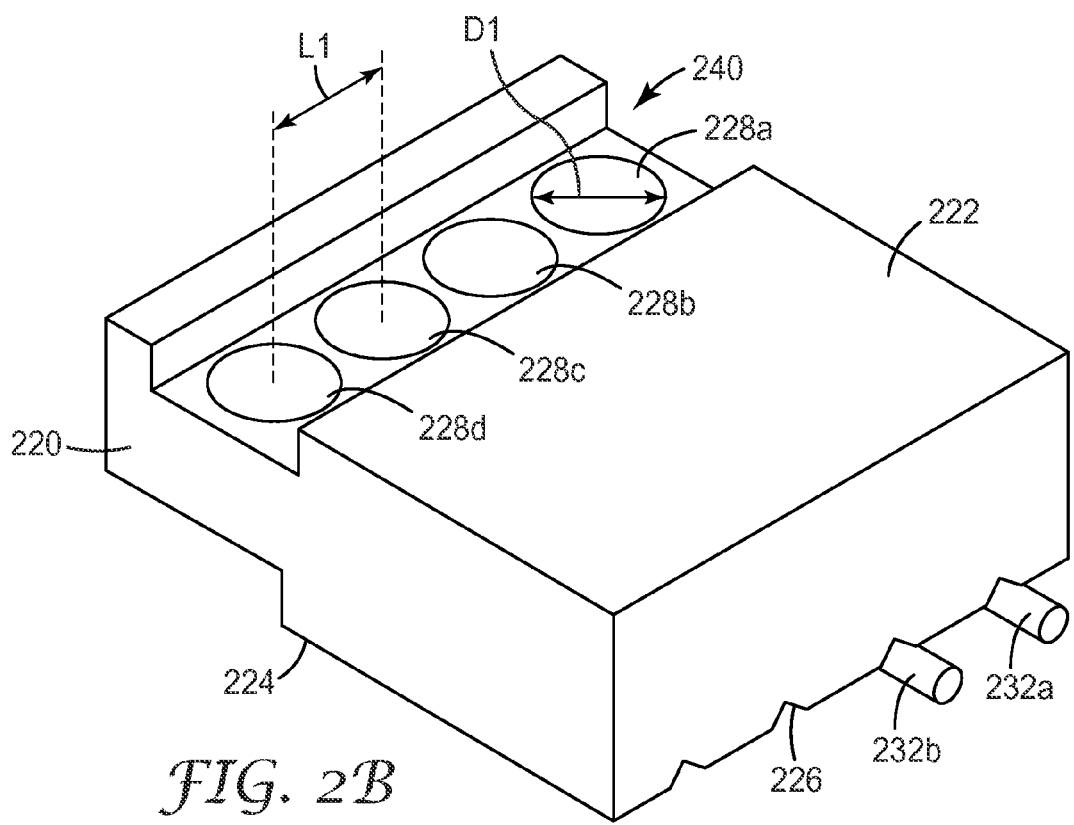
FIG. 2B shows a bottom perspective schematic view of a unitary substrate.

FIG. 2B shows a bottom perspective schematic view of the unitary substrate 220 of FIG. 2A. Unitary substrate 220 includes the first surface 224 and the opposing second surface 222 having a plurality of microlenses 228a, 228b, 228c, 228d, that are dispose within a microlens pocket 240. Each of the plurality of microlenses 228a, 228b, 228c, 228d are aligned with a light redirecting feature 235a-235d described above, and are disposed to receive light from the respective light redirecting surface 236a, 236b, 236c, 236d. Each of the microlenses have a microlens diameter D1, and are disposed within microlens pocket 240 with a center-to-center spacing L1. The center-to-center spacing L1 typically is no greater than the spacing between adjacent optical fibers, and results in a restriction on the maximum microlens diameter D1 that can be utilized in the connector, as described elsewhere. The depth of microlens pocket 240 serves to keep each of the microlenses below the level of opposing second surface 222. It is to be understood that unitary substrate 220 can include any desired number of optional parallel vee-grooves 226, light re-directing elements 235a-235d, microlenses 228a-228d, and input optical fibers 232a, 232b.

Figure 3A:
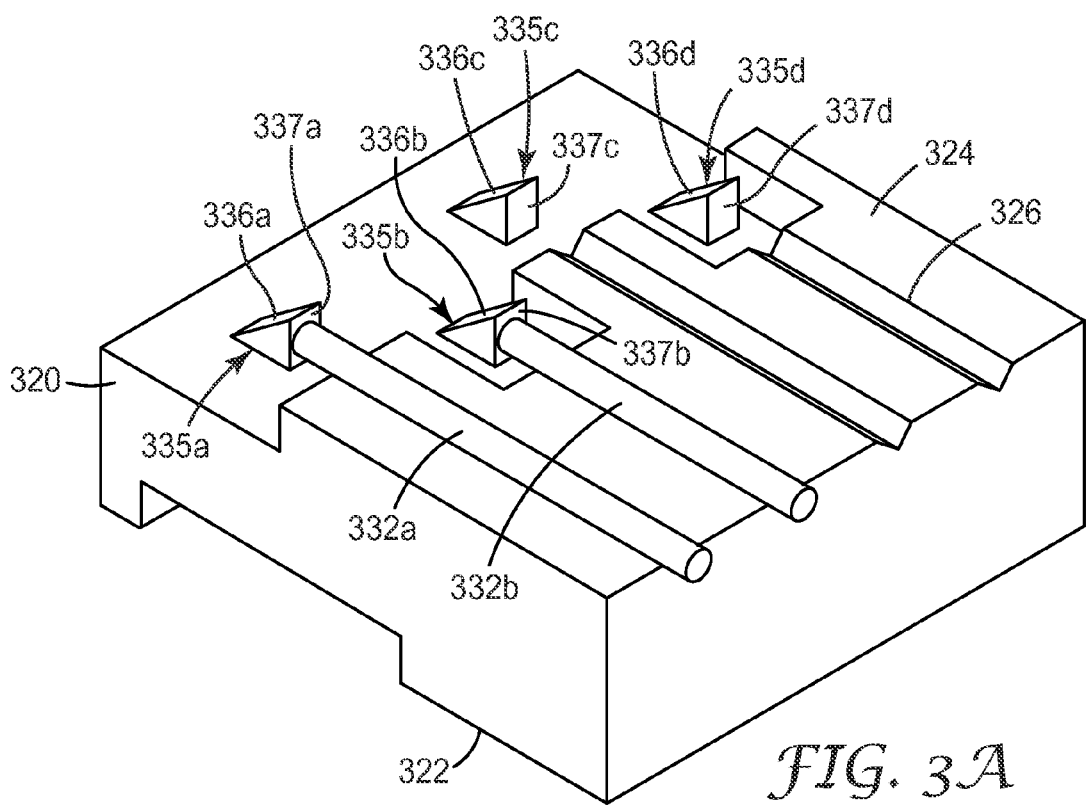
FIG. 3A shows a top perspective schematic view of a unitary substrate.

FIG. 3A shows a top perspective schematic view of a unitary substrate 320, according to one aspect of the disclosure. Unitary substrate 320 includes a first surface 324 having a plurality of optional parallel vee-grooves 326 that are aligned with a plurality of light re-directing features 335a, 335b, 335c, 335d, and an opposing second surface 322. A plurality of input optical fibers (two are shown as first input optical fiber 332a and a second input optical fiber 332b) are positioned along optional parallel vee-grooves 326, and may be adhered to the optional parallel vee-groove 326, as described elsewhere. The light re-directing features 335a-335d are in a staggered orientation, such that alternating light redirecting features 335a and 335c are in a first row, and alternating light redirecting features 335b and 335d are in a second row. In one particular embodiment, the alternating light redirecting features 335a and 335d in the first row can instead comprise a continuous light redirecting feature (not shown) that also spans the separation distance between light redirecting features 335a and 335d.

Each of the light re-directing features 335a-335d include a light redirecting surface 336a, 336b, 336c, 336d, and a light input surface 337a, 337b, 337c, 337d, respectively, that can be directly molded into unitary substrate 220. Each of the input optical fibers 332a, 332b, are positioned such that the end of each of the input optical fibers 332a, 332b are configured to inject light into the respective light input surface 337a, 337b, 337c, 337d. Each of the light redirecting surfaces 336a-

336*d* serve to re-direct light into the unitary substrate 320 at an angle perpendicular to the axis of the input optical fibers 332*a*, 332*b*.

Figure 3B:
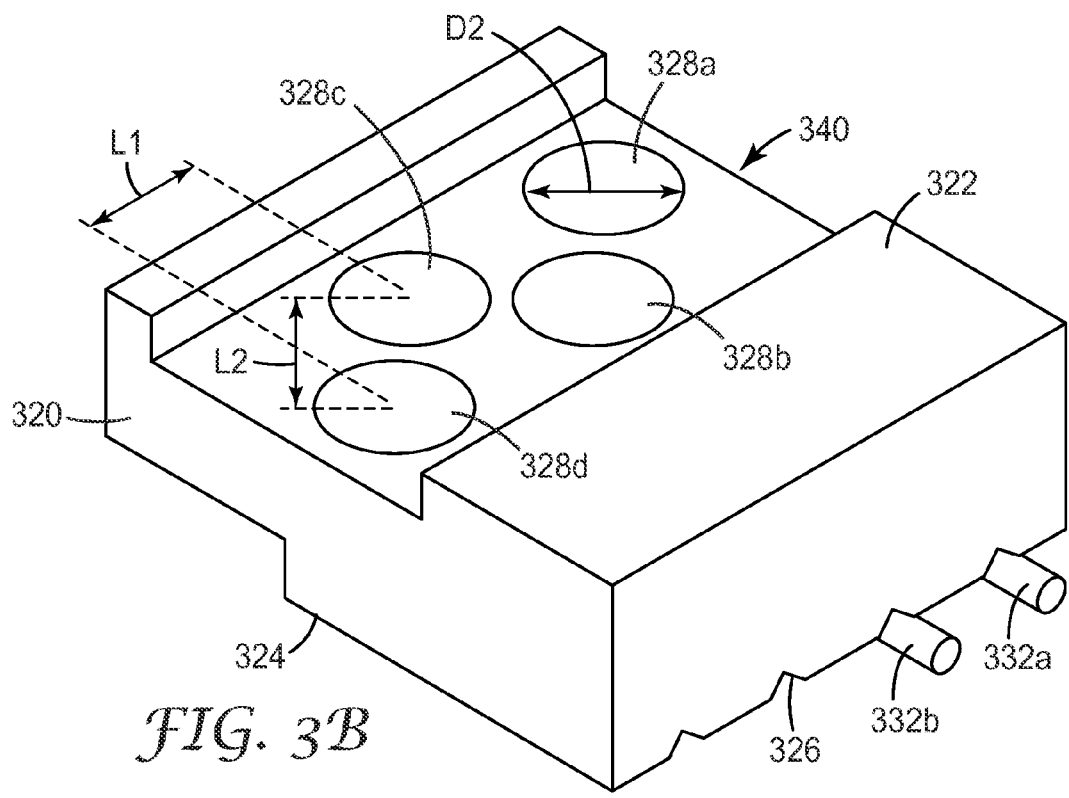
FIG. 3B shows a bottom perspective schematic view of a unitary substrate.

FIG. 3B shows a bottom perspective schematic view of the unitary substrate 320 of FIG. 3A. Unitary substrate 320 includes the first surface 324 and the opposing second surface 322 having a plurality of staggered microlenses 328*a*, 328*b*, 328*c*, 328*d*, that are disposed within a microlens pocket 340. Each of the plurality of staggered microlenses 328*a*, 328*b*, 328*c*, 328*d* are aligned with a light redirecting feature 335*a*-335*d* described above, and is disposed to receive light from the respective light redirecting surface 336*a*, 336*b*, 336*c*, 336*d*. Each of the staggered microlenses 328*a*, 328*b*, 328*c*, 328*d* have a staggered microlens diameter D2, and are disposed within microlens pocket 340 with a center-to-center spacing L1 corresponding to the separation of the optical fibers, and the center-to-center spacing L1 of adjacent microlenses 328*a*-328*d* can be the same as the center-to-center spacing L1 described with reference to FIG. 2B. However, each of the staggered microlenses 328*a*, 328*b*, 328*c*, 328*d* have a staggered spacing L2 corresponding to the separation of the microlenses, and the staggered spacing L2 is larger than the center-to-center spacing L1. As a result, the maximum microlens diameter D2 that can be utilized in the connector is greater for the staggered spacing L2 shown in FIG. 3B, as compared to the maximum microlens diameter D1 that can be utilized in the microlens spacing L1, as described elsewhere.

As a result of staggering the light redirecting features 335*a*-335*d*, the plurality of staggered microlenses 328*a*, 328*b*, 328*c*, 328*d* enable an increase in the microlens diameter D1 to the staggered microlens diameter D2. A larger staggered microlens diameter D2 is preferred. The depth of microlens pocket 340 serves to keep each of the microlenses below the level of opposing second surface 322. It is to be understood that unitary substrate 320 can include any desired number of optional parallel vee-grooves 326, light re-directing elements 335*a*-335*d*, microlenses 328*a*-328*d*, number of rows of microlenses 328*a*-328*d*, number of microlenses 328*a*-328*d* in each row, and input optical fibers 332*a*, 332*b*.

In contrast with the embodiment shown in FIGS. 2A-2B, the microlens locations shown in FIG. 3B are not defined as a single row. In this case two rows of microlenses are shown with two microlenses in each row. When used with optical fiber ribbons having a 250 micron fiber-to-fiber spacing, this allows the microlenses to approach 500 microns in diameter. The use of 500 micron diameter collimating microlenses possible with the staggered fiber/microlens embodiment shown in FIGS. 3A-3B, allows an alignment tolerance that is less stringent than is required with 250 micron diameter microlenses possible with the embodiment shown in FIGS. 2A-2B, and much less stringent than needed for physical contact connectors using conventional MT ferrules. It is to be understood that any of the optical connectors described herein can include staggered light re-directing features and correspondingly staggered microlenses as described with reference to FIGS. 3A-3B, and it may be preferable to include the staggered configurations wherever possible. Generally, the described staggered microlens designs can enable an expanded-beam optical fiber connector that can be used for a ribbonized collection of fibers, wherein the optical beam diameter exiting the microlenses is greater than the fiber-to-fiber separation (that is, pitch) in the ribbon, and the fibers do not need to be singulated in order to accomplish the connection.

Figure 4A:
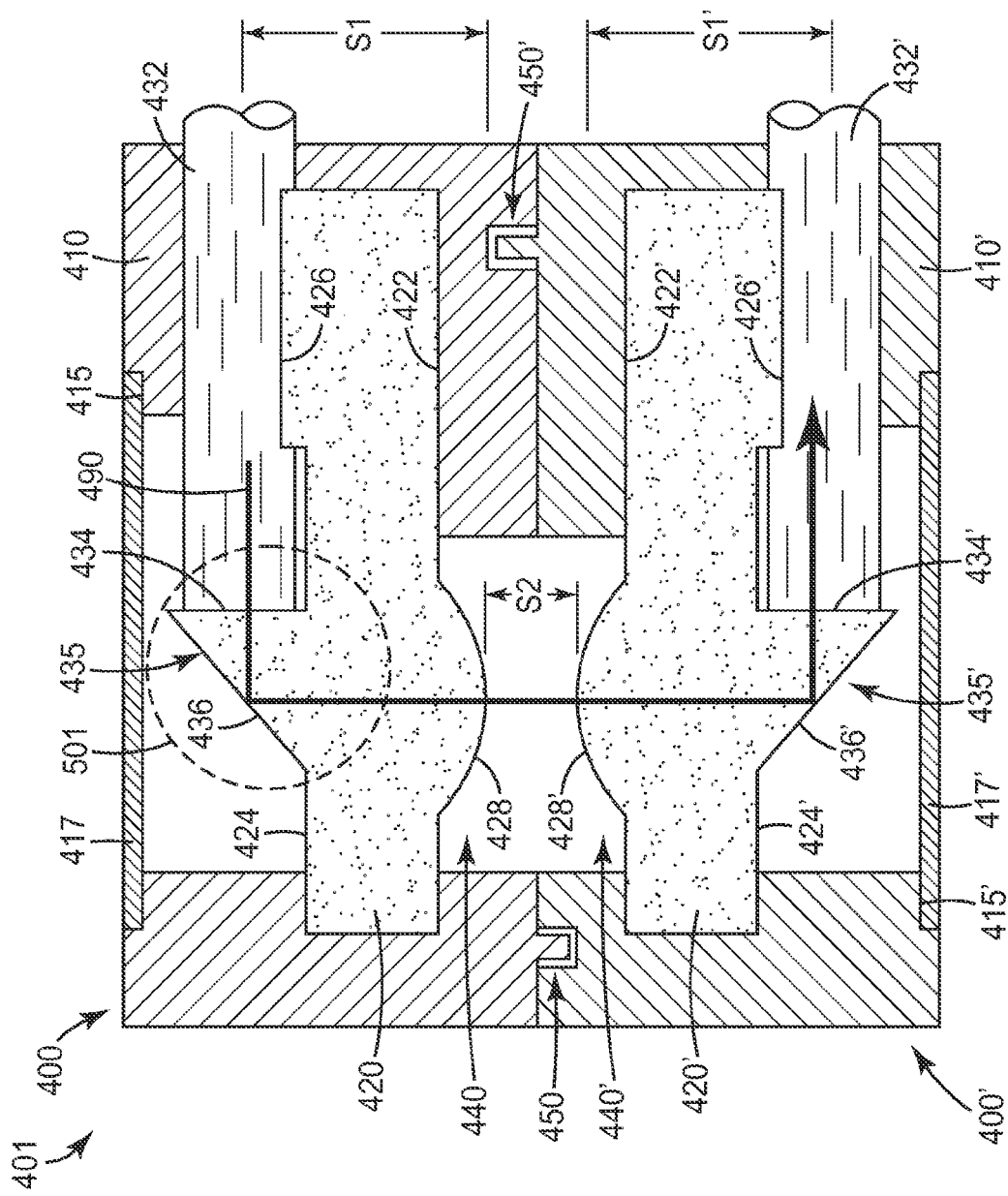
FIG. 4A shows a cross-sectional schematic view of an optical connection.

FIG. 4A shows a cross-sectional schematic view of an optical connection 401 that includes a first optical connector 400 connected to a second optical connector 400', according to one aspect of the disclosure. In FIG. 4A, the cross-sectional view is near the optical axis (that is, center) of a pair of optical fibers in communication through the connector. In one particular embodiment, second optical connector 400' can be identical to the first optical connector 400, and forms the optical connection 401, similar to the optical connection 101 shown in FIG. 1B.

First optical connector 400 includes a first connector housing 410 and a first unitary substrate 420 secured within the first connector housing 410. The first unitary substrate 420 includes a first upper surface 424 and an opposite first lower surface 422. A first optical fiber 432 is secured within a first optional parallel vee-groove 426 on first upper surface 424, between the first unitary substrate 420 and the first connector housing 410. The first connector housing 410 further includes an optional first cover support 415, and an optional first cover 417 that can serve to protect the components in the first optical connector 400. First unitary substrate 420 includes a first light re-directing feature 435 disposed on first upper surface 424, the first light re-directing feature 435 having a first light redirecting surface 436 in optical communication with first optical fiber 432. First optical fiber 432 can be held in position and aligned to first input surface 434 of first light re-directing feature 435 by resting in the first optional parallel vee-groove 426 which can be directly molded into first unitary substrate 420. In some cases, an adhesive can be used to affix the first optical fiber 432 to the first optional parallel vee-groove 426.

First unitary substrate 420 further includes a first microlens 428 disposed on the first lower surface 422, positioned such that a central light ray 490 travelling through the first optical fiber 432 that intercepts and is reflected from the first light redirecting surface 436, is directed toward the optical center of the first microlens 428. In one particular embodiment, shown in FIG. 4, first light redirecting surface 436 can be disposed such that central light ray 490 intercepts first light redirecting surface 436 at a reflection angle equal to about 45 degrees, as shown in the Figure. In some cases, first light redirecting surface 436 can be a TIR surface. In some cases, first light redirecting surface 436 can instead be a mirrored reflective surface.

In a similar manner, second optical connector 400' includes a second connector housing 410' and a second unitary substrate 420' secured within the second connector housing 410'. The second unitary substrate 420' includes a second upper surface 424' and an opposite second lower surface 422'. A second optical fiber 432' is secured within a second optional parallel vee-groove 426' on second upper surface 424', between the second unitary substrate 420' and the second connector housing 410'. The second connector housing 410' further includes an optional second cover support 415', and an optional second cover 417' that can serve to protect the components in the second optical connector 400'. Second unitary substrate 420' includes a second light re-directing feature 435' disposed on second upper surface 424', the second light re-directing feature 435' having a second light redirecting surface 436' in optical communication with second optical fiber 432'. Second optical fiber 432' can be held in position and aligned to second input surface 434' of second light re-directing feature 435' by resting in the second optional parallel vee-groove 426' which can be directly molded into second unitary substrate 420'. In some cases, an adhesive can be used to affix the second optical fiber 432' to the second optional parallel vee-groove 426'.

Second unitary substrate 420' further includes a second microlens 428' disposed on the second lower surface 422', positioned such that a light ray travelling through the second optical fiber 432' that intercepts and is reflected from the second light redirecting surface 436', is directed toward the optical center of the second microlens 428'. In one particular embodiment, shown in FIG. 4A, second light redirecting surface 436' can be disposed such that light ray 490 intercepts second light redirecting surface 436' at a reflection angle equal to about 45 degrees, as shown in the Figure. In some cases, second light redirecting surface 436' can be a TIR surface. In some cases, second light redirecting surface 436' can instead be a mirrored reflective surface.

A first and a second alignment feature 450, 450' in first and second connector housing 410, 410', respectively, serve to ensure that light from the first optical fiber 432 and the second optical fiber 432' are coupled efficiently, with a minimum of losses. First and second alignment features 450, 450' can include any suitable feature to ensure alignment of the first and second optical connectors 400, 400', and the features shown in FIG. 4 are for illustrative purposes only.

A first optical fiber separation distance S1 can be measured between the optical axis of the first optical fiber 432 and the first microlens 428. A second optical fiber separation distance S1' can be measured between the optical axis of the second optical fiber 423' and the second microlens 428'. A microlens separation distance S2 can be measured between the surfaces of the first and second microlenses 428, 428'. In some cases, each of the first optical fiber separation distance S1 and the second optical fiber separation distance S1' will be the same, and can range from about 1 mm to about 2 mm, or about 1.5 mm. The microlens separation distance S2 can range from about 0.1 mm to about 1 mm, or about 0.5 mm.

A light beam 490 travelling through first optical fiber 432 passes through first input surface 434 and is reflected from first light redirecting surface 436 in a direction perpendicular to the optical axis of first optical fiber 432. Light beam 490 then passes through first microlens 428 which can be a collimating microlens or a focusing microlens, as described elsewhere. Light beam 490 then enters second unitary substrate 420' through second microlens 428', is reflected from second light redirecting surface 436' in a direction parallel to the optical axis of the second optical fiber 432', and enters second optical fiber through light input surface 434'.

Figure 4B:
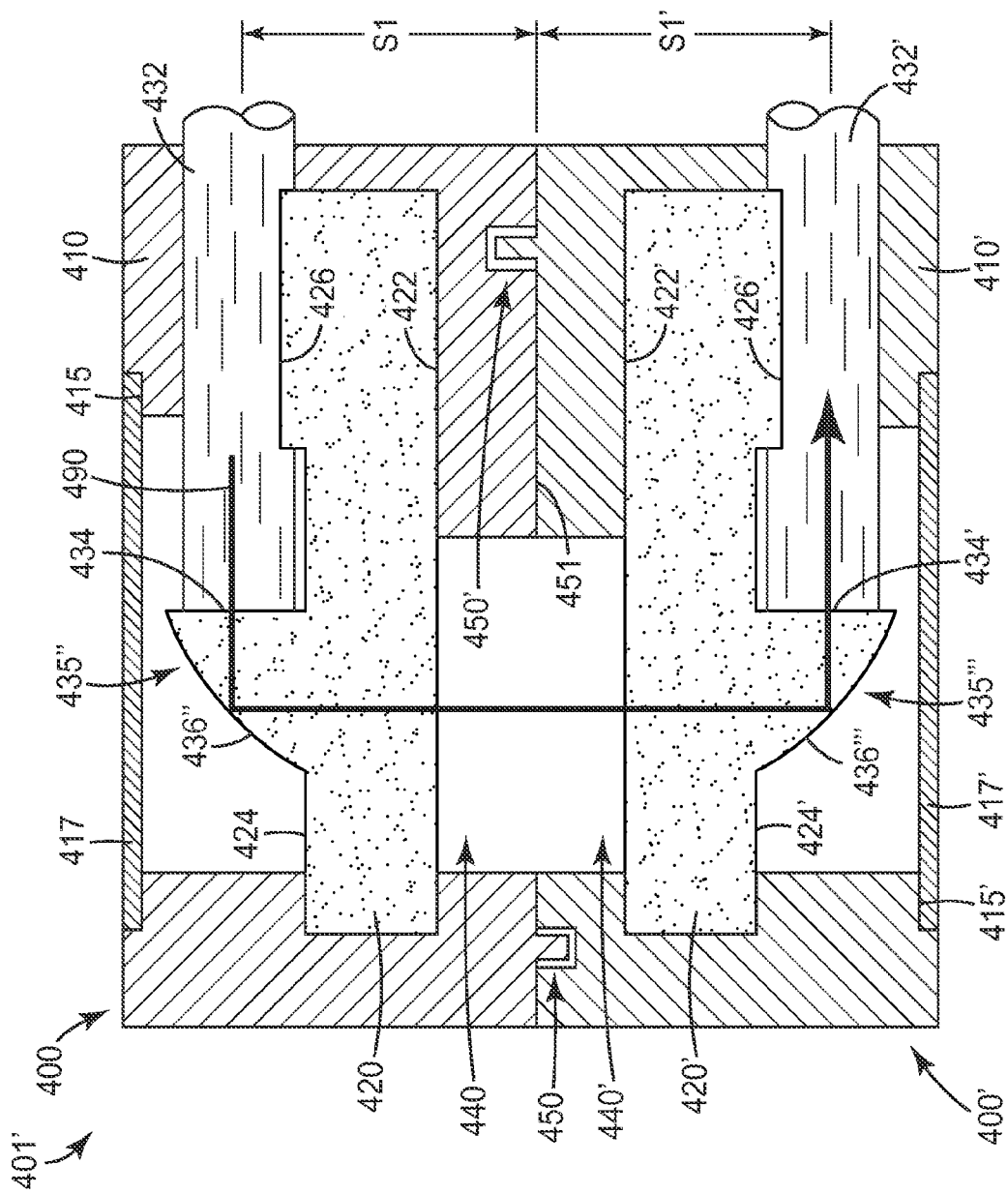
FIG. 4B shows a cross-sectional schematic view of an optical connection.

FIG. 4B shows a cross-sectional schematic view of an optical connection 401' that includes a first optical connector 400 connected to a second optical connector 400', according to one aspect of the disclosure. In FIG. 4B, the cross-sectional view is near the optical axis (that is, center) of a pair of optical fibers in communication through the connector. In one particular embodiment, second optical connector 400' can be identical to the first optical connector 400, and forms the optical connection 401, similar to the optical connection 101 shown in FIG. 1B.

First optical connector 400 includes a first connector housing 410 and a first unitary substrate 420 secured within the first connector housing 410. The first unitary substrate 420 includes a first upper surface 424 and an opposite first lower surface 422. A first optical fiber 432 is secured within a first optional parallel vee-groove 426 on first upper surface 424, between the first unitary substrate 420 and the first connector housing 410. The first connector housing 410 further includes an optional first cover support 415, and an optional first cover 417 that can serve to protect the components in the first optical connector 400. First unitary substrate 420 includes a first light re-directing feature 435" disposed on first upper surface 424, the first light re-directing feature 435" having a first light redirecting surface 436" in optical communication with first optical fiber 432. First optical fiber 432 can be held in position and aligned to first input surface 434 of first light re-directing feature 435" by resting in the first optional parallel vee-groove 426 which can be directly molded into first unitary substrate 420. In some cases, an adhesive can be used to affix the first optical fiber 432 to the first optional parallel vee-groove 426.

In one particular embodiment, first light redirecting surface 436" can be a reflective optical surface that re-directs light through first lower surface 422 as either a collimated light or a focused light. In some cases, the reflective surface can include a parabolic shaped reflector, a spherical shaped reflector, an elliptical shaped reflector, and the like. In a manner similar to the first light redirecting surface 436 and associated first microlens 428 of FIG. 4A, the collimated light beam may include a diameter that is greater than the spacing between adjacent optical fibers, as described elsewhere. In some cases, a microlens (not shown) can be included on first lower surface 422 to further shape the light beam leaving first unitary substrate 420.

In a similar manner, second optical connector 400' includes a second connector housing 410' and a second unitary substrate 420' secured within the second connector housing 410'. The second unitary substrate 420' includes a second upper surface 424' and an opposite second lower surface 422'. A second optical fiber 432' is secured within a second optional parallel vee-groove 426' on second upper surface 424, between the second unitary substrate 420' and the second connector housing 410'. The second connector housing 410' further includes an optional second cover support 415', and an optional second cover 417' that can serve to protect the components in the second optical connector 400'. Second unitary substrate 420' includes a second light re-directing feature 435'" disposed on second upper surface 424', the second light re-directing feature 435'" having a second light redirecting surface 436'" in optical communication with second optical fiber 432'. Second optical fiber 432' can be held in position and aligned to second input surface 434' of second light re-directing feature 435' by resting in the second optional parallel vee-groove 426' which can be directly molded into second unitary substrate 420'. In some cases, an adhesive can be used to affix the second optical fiber 432' to the second optional parallel vee-groove 426'.

In one particular embodiment, second light redirecting surface 436'" can be a reflective optical surface that re-directs light through second lower surface 422' as either a collimated light or a focused light. In some cases, the reflective surface can include a parabolic shaped reflector, a spherical shaped reflector, an elliptical shaped reflector, and the like. In a manner similar to the light redirecting surface 436' and associated second microlens 428' of FIG. 4A, the collimated light beam may include a diameter that is greater than the spacing between adjacent optical fibers, as described elsewhere. In some cases, a microlens (not shown) can be included on second lower surface 422' to further shape the light beam leaving second unitary substrate 420'.

A first and a second alignment feature 450, 450' in first and second connector housing 410, 410', respectively, serve to ensure that light from the first optical fiber 432 and the second optical fiber 432' are coupled efficiently, with a minimum of losses. First and second alignment features 450, 450' can include any suitable feature to ensure alignment of the first and second optical connectors 400, 400', and the features shown in FIG. 4B are for illustrative purposes only.

A first optical fiber separation distance S1 can be measured between the optical axis of the first optical fiber 432 and a connecting plane 451. A second optical fiber separation distance S1' can be measured between the optical axis of the second optical fiber 423' and the connecting plane 451. In some cases, each of the first optical fiber separation distance S1 and the second optical fiber separation distance S1' will be the same, and can range from about 1 mm to about 2 mm, or about 1.5 mm.

A light beam 490 travelling through first optical fiber 432 passes through first input surface 434 and is reflected from first light redirecting surface 436" in a direction perpendicular to the optical axis of first optical fiber 432, as a collimated light beam or a focused light beam, as described elsewhere. Light beam 490 then enters second unitary substrate 420', is reflected from second light redirecting surface 436''' in a direction parallel to the optical axis of the second optical fiber 432', and enters second optical fiber through light input surface 434'.

Figure 5:
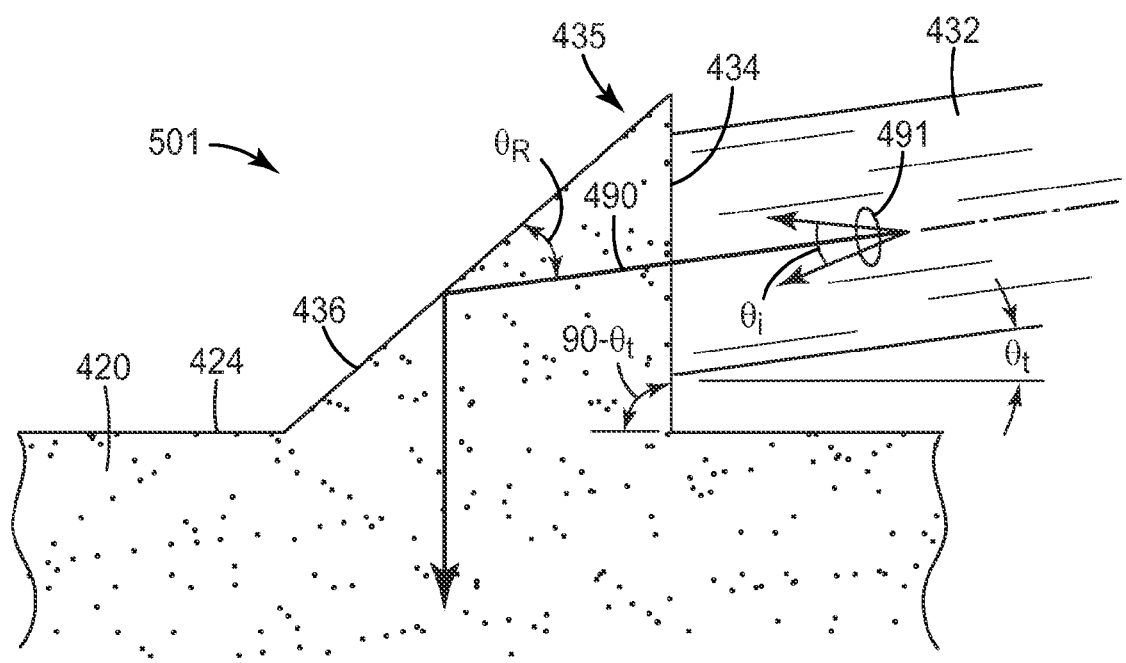
FIG. 5 shows an expanded view of a portion of an embodiment of FIG. 4A.

FIG. 5 shows an expanded view of an embodiment of a portion 501 of FIG. 4, according to one aspect of the disclosure. In this particular embodiment, the central ray is reflected at an angle greater than 90 degrees, to accommodate light beams in a multimode optical fiber. As known to one of skill in the art, the maximum reflection angle for TIR is dependent on the relative refractive indices of the materials on either side of the interface on which TIR is to occur. Generally, an optical fiber 432 can include light beams 491 travelling within a cone of angles θi centered on a propagation direction 490, and in order for TIR to be effectively utilized on light redirecting surface 436, the geometry of light redirecting feature 435 may need to be altered, for example, by tilting the fiber and adjusting the reflection angle θr.

In one particular embodiment, the first optical fiber 432 may be a "multimode" optical fiber and the direction light which exits the first optical fiber 432 can be included within a cone of light rays having an angular spread of θi=17 degrees centered on the light beam 490, and the unitary substrate may be Ultem 1010 having a refractive index of about 1.63 which is immersed in air. In this embodiment, the optical fiber 432 can be tilted at a tilt angle θt=8 degrees relative to the first upper surface 424, and the reflection angle θr of light beam 490 can be about can be about 41 degrees. As such, the angular position of first light redirecting surface 436 relative to first upper surface 424 may need to be altered to accommodate reflection from all light rays propagating through first optical fiber 432.

Figure 6:
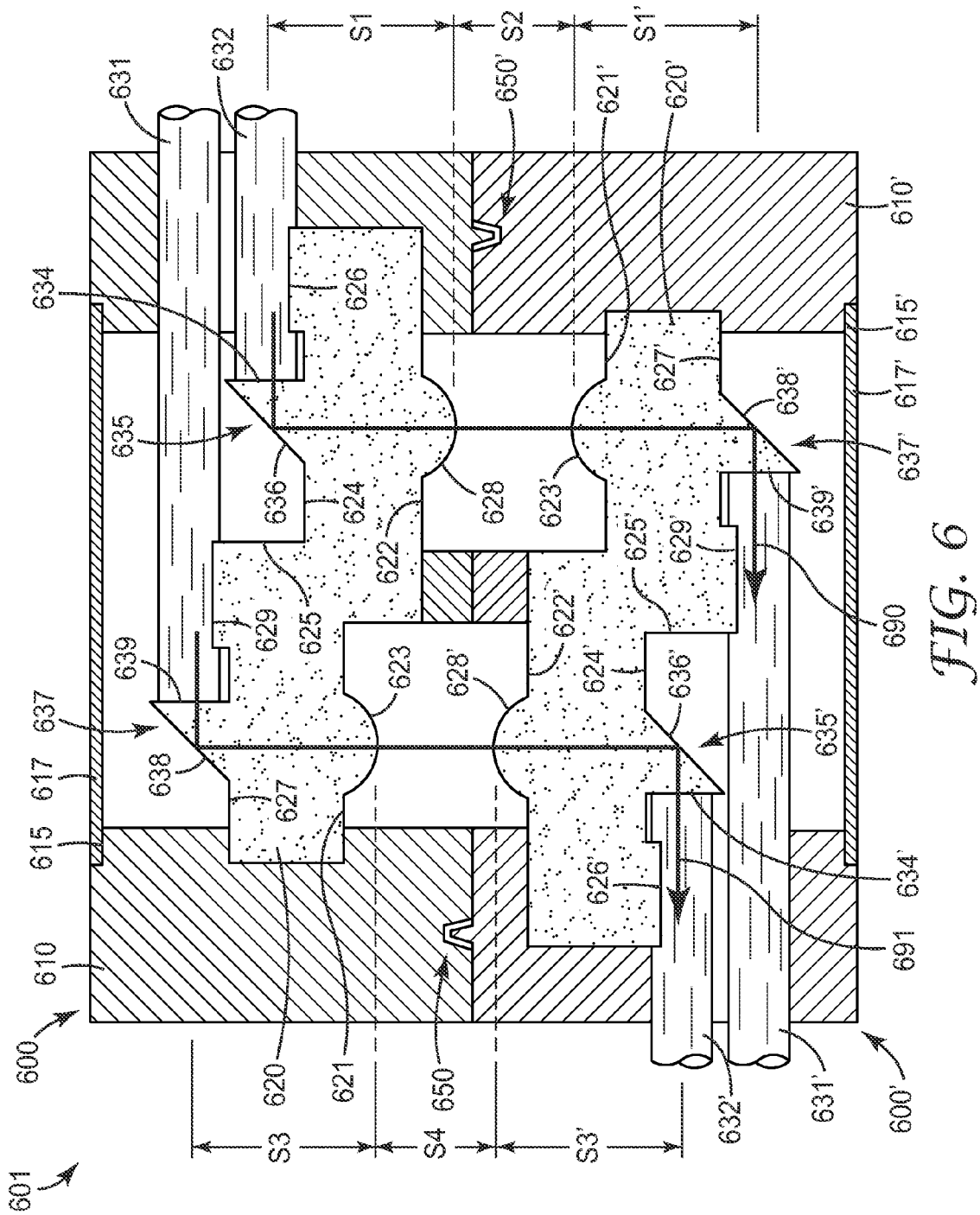
FIG. 6 shows a cross-sectional schematic view of an optical connection.

FIG. 6 shows a cross-sectional schematic view of an optical connection 601 that includes a first optical connector 600 connected to a second optical connector 600', according to one aspect of the disclosure. In FIG. 6, the cross-sectional view is near the optical axis (that is, center) of two pairs of optical fibers in communication through the connector. In one particular embodiment, second optical connector 600' can be identical to the first optical connector 600, and forms an optical connection 601, similar to the optical connection 101 shown in FIG. 1B. In some cases, second optical connector 600' can instead be a mirror image to the first optical connector 600.

First optical connector 600 includes a first connector housing 610 and a first unitary substrate 620 secured within the first connector housing 610. The first unitary substrate 620 comprises a staircase that includes a first floor surface 624, a first step 625, and a first tread 627. The first unitary substrate 620 further comprises a second floor surface 622 opposite the first floor surface 624 and a second tread 621 opposite the first tread 627. A first optical fiber 632 is secured within a first optional parallel vee-groove 626 on first floor surface 624, between the first unitary substrate 620 and the first connector housing 610. A second optical fiber 631 is secured within a second optional parallel vee-groove 629 on the first tread 627, and is also secured within first connector housing 610. The first connector housing 610 further includes an optional first cover support 615, and an optional first cover 617 that can serve to protect the components in the first optical connector 600.

First unitary substrate 620 includes a first light re-directing feature 635 disposed on first floor surface 624, the first light re-directing feature 635 having a first light redirecting surface 636 in optical communication with first optical fiber 632. First optical fiber 632 can be held in position and aligned to first input surface 634 of first light re-directing feature 635 by resting in the first optional parallel vee-groove 626 which can be directly molded into first unitary substrate 620. In some cases, an adhesive can be used to affix the first optical fiber 632 to the first optional parallel vee-groove 626.

First unitary substrate 620 further includes a second light re-directing feature 637 disposed on first tread 627, the second light re-directing feature 637 having a second light redirecting surface 638 in optical communication with second optical fiber 631. Second optical fiber 631 can be held in position and aligned to second input surface 639 of second light re-directing feature 637 by resting in the second optional parallel vee-groove 629 which can be directly molded into first unitary substrate 620. In some cases, an adhesive can be used to affix the second optical fiber 631 to the second optional parallel vee-groove 629.

First unitary substrate 620 further includes a first microlens 628 disposed on the second floor surface 622, positioned such that a light ray travelling through the first optical fiber 632 that intercepts and is reflected from the first light redirecting surface 636, is directed toward the optical center of the first microlens 628. First unitary substrate 620 still further includes a second microlens 623 disposed on the second tread 621, positioned such that a light ray travelling through the second optical fiber 631 that intercepts and is reflected from the second light redirecting surface 638, is directed toward the optical center of the second microlens 623.

In a similar manner, second optical connector 600' includes a second connector housing 610' and a second unitary substrate 620' secured within the second connector housing 610'. The second unitary substrate 620' comprises a staircase that includes a third floor surface 624', a second step 625', and a third tread 627'. The second unitary substrate 620' further comprises a fourth floor surface 622' opposite the third floor surface 624' and a fourth tread 621' opposite the third tread 627'. A third optical fiber 632' is secured within a third optional parallel vee-groove 626' on third floor surface 624', between the second unitary substrate 620' and the second connector housing 610'. A fourth optical fiber 631' is secured within a fourth optional parallel vee-groove 629' on the third tread 627', and is also secured within second connector housing 610'. The second connector housing 610' further includes an optional second cover support 615', and an optional second cover 617' that can serve to protect the components in the second optical connector 600'.

Second unitary substrate 620' includes a third light re-directing feature 635' disposed on third floor surface 624', the third light re-directing feature 635' having a third light redirecting surface 636' in optical communication with third optical fiber 632'. Third optical fiber 632' can be held in position and aligned to third input surface 634' of third light re-directing feature 635' by resting in the third optional parallel vee-groove 626' which can be directly molded into second unitary substrate 620'. In some cases, an adhesive can be used to affix the third optical fiber 632' to the third optional parallel vee-groove 626'.

Second unitary substrate 620' further includes a fourth light re-directing feature 637' disposed on third tread 627', the fourth light re-directing feature 637' having a fourth light redirecting surface 638' in optical communication with fourth optical fiber 631'. Fourth optical fiber 631' can be held in position and aligned to fourth input surface 639' of fourth light re-directing feature 637' by resting in the fourth optional parallel vee-groove 629' which can be directly molded into second unitary substrate 620'. In some cases, an adhesive can be used to affix the fourth optical fiber 631' to the fourth optional parallel vee-groove 629'.

Second unitary substrate 620' further includes a third microlens 628' disposed on the fourth floor surface 622', positioned such that a light ray travelling through the third optical fiber 632' that intercepts and is reflected from the third light redirecting surface 636', is directed toward the optical center of the third microlens 628'. Second unitary substrate 620' still further includes a fourth microlens 623' disposed on the fourth tread 621', positioned such that a light ray travelling through the fourth optical fiber 631' that intercepts and is reflected from the fourth light redirecting surface 638', is directed toward the optical center of the fourth microlens 623'.

A first and a second alignment feature 650, 650' in first and second connector housing 610, 610', respectively, serve to ensure that light from the first optical fiber 632 and the fourth optical fiber 431' are coupled efficiently, and also that light from the second optical fiber 631 and the third optical fiber 632' are coupled efficiently, with a minimum of losses. First and second alignment features 650, 650' can include any suitable feature to ensure alignment of the first and second optical connectors 600, 600', and the features shown in FIG. 6 are for illustrative purposes only.

A first optical fiber separation distance S1 can be measured between the optical axis of the first optical fiber 632 and the first microlens 628. A second optical fiber separation distance S1' can be measured between the optical axis of the fourth optical fiber 631' and the fourth microlens 623'. A first microlens separation distance S2 can be measured between the surfaces of the first and fourth microlenses 628, 623'. Similarly, a third optical fiber separation distance S3 can be measured between the optical axis of the second optical fiber 631 and the second microlens 623. A fourth optical fiber separation distance S3' can be measured between the optical axis of the third optical fiber 632' and the third microlens 628'. A second microlens separation distance S4 can be measured between the surfaces of the second and third microlenses 623, 628'.

In some cases, each of the first through fourth optical fiber separation distances S1, S1', S3, S3', can be the same, and can range from about 1 mm to about 2 mm, or about 1.5 mm. In some cases, each of the first and second microlens separation distance S2, S4, can be the same, and can range from about 0.1 mm to about 1 mm, or about 0.5 mm. In one particular embodiment, each of the connection path lengths through the connector can be the same, such that the first-fourth optical fiber path length S1+S2+S1' is equal to the second-third optical fiber path length S3+S4+S3'.

A first light beam 690 travelling through first optical fiber 632 passes through first input surface 634 and is reflected from first light redirecting surface 636 in a direction perpendicular to the optical axis of first optical fiber 632. First light beam 690 then passes through first microlens 628 which can be a collimating microlens or a focusing microlens, as described elsewhere. First light beam 690 then enters second unitary substrate 620' through fourth microlens 623', is reflected from fourth light redirecting surface 638' in a direction parallel to the optical axis of the fourth optical fiber 631', and enters fourth optical fiber 631' through fourth light input surface 639'.

In a similar manner, a second light beam 691 travelling through second optical fiber 631 passes through second input surface 639 and is reflected from second light redirecting surface 638 in a direction perpendicular to the optical axis of second optical fiber 631. Second light beam 691 then passes through second microlens 623 which can be a collimating microlens or a focusing microlens, as described elsewhere. Second light beam 691 then enters second unitary substrate 620' through third microlens 628', is reflected from third light redirecting surface 636' in a direction parallel to the optical axis of the third optical fiber 632', and enters third optical fiber 632' through third light input surface 634'.

In one particular embodiment, an antireflective (AR) coating can be applied to portions of the unitary substrate, the optical fiber, or to both the unitary substrate and the optical fiber, in order to further reduce reflective (that is, Fresnel) losses. In some cases, an AR coating can be applied to the input surface of the light redirecting feature, and also to the output surface of the optical fiber. In some cases, an AR coating can also be applied to the surface of the microlenses. In one particular embodiment, an index matching gel or an index matching adhesive can be disposed in the region surrounding the light input surface and the optical fiber, also to reduce reflective losses.

Following are a list of embodiments of the present disclosure.

Item 1 is a unitary substrate comprising: a first major surface comprising a plurality of staggered light redirecting features; and an opposing second major surface comprising a plurality of staggered microlenses, each light redirecting feature corresponding to a different micromicrolens and comprising: an input surface for receiving light from an optical waveguide; and a light redirecting surface for redirecting the received light to the corresponding microlens through the substrate, the light redirecting surface making an oblique angle with the input surface; wherein the substrate and the pluralities of the microlenses and the light redirecting features form a unitary construction.

Item 2 is the unitary substrate of item 1, wherein the staggered light redirecting features form spaced apart rows of light redirecting features.

Item 3 is the unitary substrate of item 2, wherein the light redirecting features in a row are spaced apart along the row, the spaces being adapted to receive optical waveguides that couple light to the light directing features in another row.

Item 4 is the unitary substrate of item 1 to item 3, wherein the optical waveguide comprises optical fibers.

Item 5 is the unitary substrate of item 1 to item 4, wherein the staggered microlenses form spaced apart rows of microlenses.

Item 6 is the unitary substrate of item 1 to item 5, wherein the light redirecting feature comprises a prism.

Item 7 is the unitary substrate of item 1 to item 6, wherein the light redirecting feature comprises a planar surface disposed at an angle between about 40 degrees and about 45 degrees to the optical fiber.

Item 8 is the unitary substrate of item 1 to item 7, wherein the redirecting occurs by total internal reflection (TIR).

Item 9 is the unitary substrate of item 1 to item 8, wherein the redirecting occurs by reflection from a mirror.

Item 10 is the unitary substrate of item 1 to item 9, wherein the microlens diameter is greater than a separation distance between adjacent optical fibers.

Item 11 is the unitary substrate of item 1 to item 10, further comprising an antireflective coating disposed on at least one of the input surface, an end of the optical fiber, and on a surface of the microlens.

Item 12 is an optical construction, comprising: the unitary substrate of item 1 to item 11; and a plurality of optical fibers, each of the plurality of optical fibers having an end face that faces an input face of a different discrete light redirecting feature in the plurality of staggered light redirecting features.

Item 13 is a unitary substrate comprising: a first major surface comprising a plurality of spaced apart discrete light redirecting features disposed along a first row and adapted to redirect light exiting a first plurality of optical fibers and a continuous light redirecting feature spaced apart from the first row adapted to redirect light exiting a different second plurality of optical fibers, each space between the plurality of discrete spaced apart light redirecting features in the first row being adapted to receive a corresponding different optical fiber from the second plurality of optical fibers; and a second major surface opposite the first major surface and comprising a plurality of staggered microlenses forming first and second rows of microlenses, each microlens in the first row being adapted to receive light that is redirected by a corresponding different discrete light redirecting feature in the first row of spaced apart discrete light redirecting features, and each microlens in the second row being adapted to receive light that is redirected from the continuous light redirecting feature, wherein the substrate, the plurality of spaced apart discrete light redirecting features, the continuous light redirecting feature, and the pluralities of staggered microlenses form a unitary construction.

Item 14 is the unitary substrate of item 13, wherein the second major surface comprises a first channel that comprises the first row of microlenses.

Item 15 is the unitary substrate of item 11 or item 14, wherein each light redirecting feature comprises an input surface for receiving light from an optical fiber, and a light redirecting surface for redirecting the received light to the corresponding microlens through the unitary substrate, the light redirecting surface making an oblique angle with the input surface.

Item 16 is the unitary substrate of item 15, further comprising an antireflective coating disposed on at least one of the input surface, an end of the optical fiber, and a surface of the microlenses.

Item 17 is an optical construction comprising: the unitary substrate of item 11 to item 16; a first plurality of optical fibers, each fiber having an end face that faces an input face of a different discrete light redirecting feature in the plurality of spaced apart discrete light redirecting features; and a different second plurality of optical fibers, each fiber being disposed in a corresponding different space between the plurality of spaced apart discrete light redirecting features, each fiber having an end face that faces an input face of the continuous light redirecting feature.

Item 18 is a unitary substrate comprising: a first major side comprising a first floor surface; a first staircase formed on the first floor surface and comprising at least a first step comprising a first tread; a first plurality of staggered light redirecting features disposed on the first floor surface and forming rows of light redirecting features; a second plurality of staggered light redirecting features disposed on the first tread of the first staircase and forming rows of light redirecting features; a second major side opposite the first major side and comprising a second floor surface; a second staircase formed on the second floor surface and comprising at least a first step comprising a first tread; a first plurality of staggered microlenses disposed on the second floor surface and forming rows of microlenses, each microlens corresponding to a different light redirecting feature on the first floor; a second plurality of staggered microlenses disposed on the first tread of the second staircase and forming rows of microlenses, each microlens corresponding to a different light redirecting feature on the first tread of the first staircase; wherein the substrate, the first and second staircases, the light redirecting features, and the microlenses form a unitary construction.

Item 19 is the unitary substrate of item 18, wherein a separation distance between each light redirecting feature and the corresponding microlens is a constant.

Item 20 is the unitary substrate of item 18 or item 19, wherein each light redirecting feature comprises an input surface for receiving light from an optical fiber, and a light redirecting surface for redirecting the received light to the corresponding microlens through the unitary substrate, the light redirecting surface making an oblique angle with the input surface.

Item 21 is the unitary substrate of item 20, further comprising an antireflective coating disposed on at least one of the input surface, an end of the optical fiber, and a surface of the microlenses.

Item 22 is a unitary substrate comprising: a first major surface comprising a plurality of staggered light redirecting features, each light redirecting feature comprising: an input surface for receiving light from an optical waveguide; a light redirecting surface for redirecting the received light as a collimated light or a focused light through the substrate, the light redirecting surface including a shaped reflector; and an opposing second major surface, wherein the substrate and the pluralities of the light redirecting features form a unitary construction.

Item 23 is the unitary substrate of item 22, wherein the staggered light redirecting features form spaced apart rows of light redirecting features.

Item 24 is the unitary substrate of item 22 or item 23, wherein the light redirecting features in a row are spaced apart along the row, the spaces being adapted to receive optical waveguides that couple light to the light directing features in another row.

Item 25 is the unitary substrate of item 22 to item 24, wherein the optical waveguides comprise optical fibers.

Item 26 is the unitary substrate of item 22 to item 25, wherein the opposing second major surface includes a plurality of staggered microlenses in alignment with and corresponding to the staggered light redirecting features.

Item 27 is the unitary substrate of item 22 to item 26, wherein the shaped reflector comprises a parabolic reflector, a spherical reflector, or an elliptical reflector.

Item 28 is a unitary substrate comprising: a first major side comprising a first floor surface; a first staircase formed on the first floor surface and comprising at least a first step comprising a first tread; a first plurality of light redirecting features and a first waveguide alignment feature disposed on the first floor surface, the first waveguide alignment feature capable of positioning a first plurality of optical waveguides to inject light into the first plurality of light redirecting features; a second plurality of light redirecting features and a second waveguide alignment feature disposed on the first tread of the first staircase, the second waveguide alignment feature capable of positioning a second plurality of optical waveguides to inject light into the second plurality of light redirecting features; a second major side opposite the first major side and comprising a second floor surface; a second staircase formed on the second floor surface and comprising at least a first step comprising a first tread; a first plurality of microlenses disposed on the second floor surface, each microlens corresponding to a different light redirecting feature on the first floor; and a second plurality of microlenses disposed on the first tread of the second staircase, each microlens corresponding to a different light redirecting feature on the first tread of the first staircase; wherein the substrate, the first and second staircases, the light redirecting features, and the microlenses form a unitary construction.

Item 29 is an optical connector comprising: an optical fiber ribbon cable; and the unitary substrate of item 1 to item 28.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A unitary substrate comprising:
a first major surface comprising a plurality of staggered light redirecting features; and
an opposing second major surface comprising a plurality of staggered microlenses, each light redirecting feature corresponding to a different microlens and comprising:
an input surface for receiving light from an optical waveguide; and
a light redirecting surface for redirecting the received light to the corresponding microlens through the substrate, the light redirecting surface making an oblique angle with the input surface;
wherein the substrate and the pluralities of the microlenses and the light redirecting features form a unitary construction.

2. The unitary substrate of claim 1, wherein the staggered light redirecting features form spaced apart rows of light redirecting features.

3. The unitary substrate of claim 2, wherein the light redirecting features in a row are spaced apart along the row, spaces between the light redirecting features in the row being adapted to receive optical waveguides that couple light to the light directing features in another row.

4. The unitary substrate of claim 1, wherein the redirecting occurs by reflection from a mirror.

5. The unitary substrate of claim 1, wherein the staggered microlenses form spaced apart rows of microlenses.

6. The unitary substrate of claim 1, wherein the light redirecting feature comprises a prism.

7. The unitary substrate of claim 1, wherein the light redirecting feature comprises a planar surface disposed at an angle between about 40 degrees and about 45 degrees to the optical waveguide.

8. The unitary substrate of claim 1, wherein the redirecting occurs by total internal reflection (TIR).

9. The unitary substrate of claim 1, wherein the optical waveguide comprises optical fibers.

10. The unitary substrate of claim 9, wherein the microlens diameter is greater than a separation distance between adjacent optical fibers.

11. The unitary substrate of claim 1, further comprising an antireflective coating disposed on at least one of the input surface, an end of the optical waveguide, and a surface of the microlenses.

12. An optical construction, comprising:
the unitary substrate of claim 1; and
a plurality of optical fibers, each of the plurality of optical fibers having an end face that faces an input face of a different discrete light redirecting feature in the plurality of staggered light redirecting features.

13. An optical connector comprising:
an optical fiber ribbon cable; and
the unitary substrate of claim 1.

14. A unitary substrate comprising:
a first major surface comprising a plurality of spaced apart discrete light redirecting features disposed along a first row and adapted to redirect light exiting a first plurality of optical fibers and a continuous light redirecting feature spaced apart from the first row adapted to redirect light exiting a second plurality of optical fibers, each space between the plurality of discrete spaced apart light redirecting features in the first row being adapted to receive a corresponding different optical fiber from the second plurality of optical fibers; and
a second major surface opposite the first major surface and comprising a plurality of staggered microlenses forming first and second rows of microlenses, each microlens in the first row being adapted to receive light that is redirected by a corresponding different discrete light redirecting feature in the first row of spaced apart discrete light redirecting features, and each microlens in the second row being adapted to receive light that is redirected from the continuous light redirecting feature, wherein the substrate, the plurality of spaced apart discrete light redirecting features, the continuous light redirecting feature, and the pluralities of staggered microlenses form a unitary construction.

15. The unitary substrate of claim 14, wherein each light redirecting feature comprises an input surface for receiving light from an optical fiber, and a light redirecting surface for redirecting the received light to the corresponding microlens through the unitary substrate, the light redirecting surface making an oblique angle with the input surface.

16. The unitary substrate of claim 15, further comprising an antireflective coating disposed on at least one of the input surface, an end of the optical fiber, and a surface of the microlenses.

17. An optical construction comprising:
the unitary substrate of claim 14;
a first plurality of optical fibers, each fiber having an end face that faces an input face of a different discrete light redirecting feature in the plurality of spaced apart discrete light redirecting features; and
a second plurality of optical fibers, each fiber being disposed in a corresponding different space between the plurality of spaced apart discrete light redirecting features, each fiber having an end face that faces an input face of the continuous light redirecting feature.

18. The unitary substrate of claim 14, wherein the second major surface comprises a first channel that comprises the first row of microlenses.

19. A unitary substrate comprising:
a first major side comprising a first floor surface;
a first staircase formed on the first floor surface and comprising at least a first step comprising a first tread;
a first plurality of staggered light redirecting features disposed on the first floor surface and forming rows of light redirecting features;
a second plurality of staggered light redirecting features disposed on the first tread of the first staircase and forming rows of light redirecting features;
a second major side opposite the first major side and comprising a second floor surface;
a second staircase formed on the second floor surface and comprising at least a first step comprising a first tread;
a first plurality of staggered microlenses disposed on the second floor surface and forming rows of microlenses, each microlens corresponding to a different light redirecting feature on the first floor; and
a second plurality of staggered microlenses disposed on the first tread of the second staircase and forming rows of microlenses, each microlens corresponding to a different light redirecting feature on the first tread of the first staircase;
wherein the substrate, the first and second staircases, the light redirecting features, and the microlenses form a unitary construction.

20. The unitary substrate of claim 19, wherein each light redirecting feature comprises an input surface for receiving light from an optical fiber, and a light redirecting surface for redirecting the received light to the corresponding microlens through the unitary substrate, the light redirecting surface making an oblique angle with the input surface.

21. The unitary substrate of claim 20, further comprising an antireflective coating disposed on at least one of the input surface, an end of the optical fiber, and a surface of the microlenses.

22. The unitary substrate of claim 19, wherein a separation distance between each light redirecting feature and the corresponding microlens is a constant.

23. A unitary substrate comprising:
a first major surface comprising a plurality of staggered light redirecting features, each light redirecting feature comprising:
an input surface for receiving light from an optical waveguide;
a light redirecting surface for redirecting the received light as a collimated light or a focused light through the substrate, the light redirecting surface including a shaped reflector; and
an opposing second major surface, wherein the substrate and the pluralities of the light redirecting features form a unitary construction.

24. The unitary substrate of claim 23, wherein the staggered light redirecting features form spaced apart rows of light redirecting features.

25. The unitary substrate of claim 24, wherein the light redirecting features in a row are spaced apart along the row, spaces between the light redirecting features in the row being adapted to receive optical waveguides that couple light to the light directing features in another row.

26. The unitary substrate of claim 23, wherein the opposing second major surface includes a plurality of staggered microlenses in alignment with and corresponding to the staggered light redirecting features.

27. The unitary substrate of claim 23, wherein the shaped reflector comprises a parabolic reflector, a spherical reflector, or an elliptical reflector.

28. The unitary substrate of claim 23, wherein the optical waveguides comprise optical fibers.

29. A unitary substrate comprising:
a first major side comprising a first floor surface;
a first staircase formed on the first floor surface and comprising at least a first step comprising a first tread;
a first plurality of light redirecting features and a first waveguide alignment feature disposed on the first floor surface, the first waveguide alignment feature capable of positioning a first plurality of optical waveguides to inject light into the first plurality of light redirecting features;
a second plurality of light redirecting features and a second waveguide alignment feature disposed on the first tread of the first staircase, the second waveguide alignment feature capable of positioning a second plurality of optical waveguides to inject light into the second plurality of light redirecting features;
a second major side opposite the first major side and comprising a second floor surface;
a second staircase formed on the second floor surface and comprising at least a first step comprising a first tread;
a first plurality of microlenses disposed on the second floor surface, each microlens corresponding to a different light redirecting feature on the first floor; and
a second plurality of microlenses disposed on the first tread of the second staircase, each microlens corresponding to a different light redirecting feature on the first tread of the first staircase;
wherein the substrate, the first and second staircases, the light redirecting features, and the microlenses form a unitary construction.

\* \* \* \* \*